United States Patent
Hara

(10) Patent No.: US 10,635,926 B2
(45) Date of Patent: Apr. 28, 2020

(54) IMAGE ANALYZING APPARATUS, IMAGE ANALYZING METHOD, AND RECORDING MEDIUM

(71) Applicant: Ricoh Company, Ltd., Tokyo (JP)

(72) Inventor: Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 227 days.

(21) Appl. No.: 15/664,480

(22) Filed: Jul. 31, 2017

(65) Prior Publication Data

US 2018/0039856 A1 Feb. 8, 2018

(30) Foreign Application Priority Data

Aug. 4, 2016 (JP) .................................. 2016-153492

(51) Int. Cl.
| | |
|---|---|
| *G06K 9/46* | (2006.01) |
| *G06K 9/66* | (2006.01) |
| *G06N 3/04* | (2006.01) |
| *G06T 7/11* | (2017.01) |
| *G06N 3/08* | (2006.01) |

(52) U.S. Cl.
CPC .............. *G06K 9/4671* (2013.01); *G06K 9/66* (2013.01); *G06N 3/0454* (2013.01); *G06N 3/0472* (2013.01); *G06N 3/08* (2013.01); *G06T 7/11* (2017.01); *G06N 3/0481* (2013.01)

(58) Field of Classification Search
CPC .......... G06K 9/4671; G06K 9/66; G06T 7/11; G06N 3/0472
See application file for complete search history.

(56) References Cited

U.S. PATENT DOCUMENTS

| | | | |
|---|---|---|---|
| 2005/0187445 A1* | 8/2005 | Han .................. | G05B 17/02 600/322 |
| 2007/0110273 A1 | 5/2007 | Hara | |
| 2012/0002881 A1* | 1/2012 | Maeda .............. | G06K 9/00677 382/195 |
| 2012/0301032 A1* | 11/2012 | Kawanishi ........... | G06F 16/583 382/190 |
| 2015/0254819 A1 | 9/2015 | Hara | |

(Continued)

FOREIGN PATENT DOCUMENTS

| | | |
|---|---|---|
| JP | 2002-245441 | 8/2002 |
| JP | 2010-257423 | 11/2010 |

(Continued)

OTHER PUBLICATIONS

Laurent Itti, et al., "A Model of Saliency-Based Visual Attention for Rapid Scene Analysis" IEEE Transactions on Pattern Analysis and Machine Intelligence, vol. 20, No. 11, Nov. 1998, p. 1254-1259.

(Continued)

*Primary Examiner* — Bobbak Safaipour
(74) *Attorney, Agent, or Firm* — Xsensus LLP

(57) ABSTRACT

An image analyzing apparatus reprojects an input image in a plurality of different directions to divide the input image into a plurality of partial images, extracts a feature amount from each of the partial images, and calculates a degree of importance of the input image by position from the extracted feature amount in accordance with a predetermined regression model.

15 Claims, 13 Drawing Sheets

(56) References Cited

U.S. PATENT DOCUMENTS

| | | | | |
|---|---|---|---|---|
| 2015/0317820 | A1* | 11/2015 | Choi | G06T 15/08 |
| | | | | 382/132 |
| 2016/0112704 | A1* | 4/2016 | Grange | H04N 19/597 |
| | | | | 375/240.12 |
| 2016/0112705 | A1* | 4/2016 | Mukherjee | H04N 19/597 |
| | | | | 375/240.18 |
| 2018/0182065 | A1* | 6/2018 | Yoshida | G06T 3/0062 |
| 2018/0184001 | A1* | 6/2018 | Yoshida | H04N 1/00 |
| 2018/0260646 | A1* | 9/2018 | Hara | G06K 9/6226 |
| 2019/0073522 | A1* | 3/2019 | Zhao | G06K 9/6209 |

FOREIGN PATENT DOCUMENTS

| | | |
|---|---|---|
| JP | 2013-140437 | 7/2013 |
| JP | 2013-142991 | 7/2013 |
| WO | WO2007/020789 A1 | 2/2007 |

OTHER PUBLICATIONS

Rui Zhao, et al., "Saliency Detection by Multi-Context Deep Learning" Proceedings of the IEEE Conference on Computer Vision and Pattern Recognition, 2015, p. 1265-1274.

Xun Huang, et al., "SALICON: Reducing the Semantic Gap in Saliency Prediction by Adapting Deep Neural Networks" Proceedings of the IEEE International Conference on Computer Vision, 2015, p. 262-270.

* cited by examiner

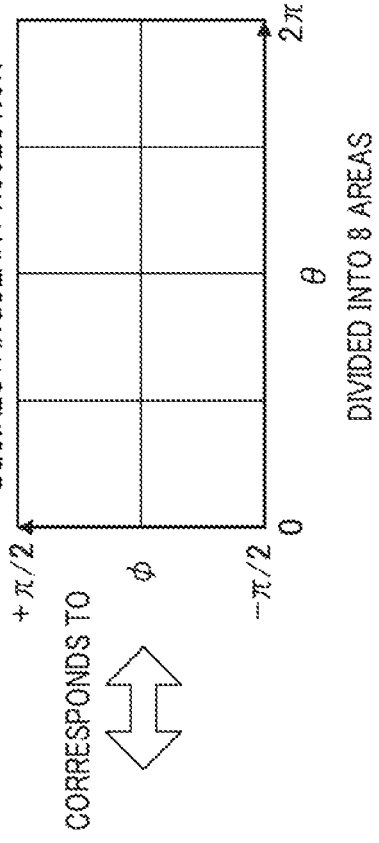
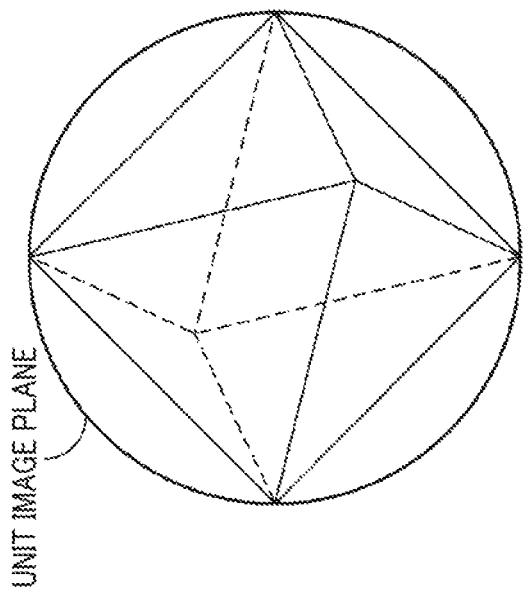
FIG. 5A
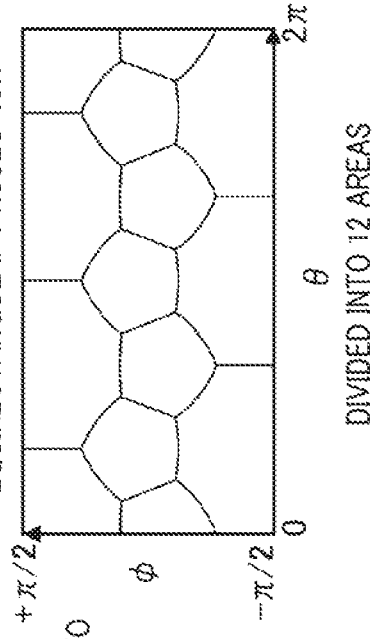
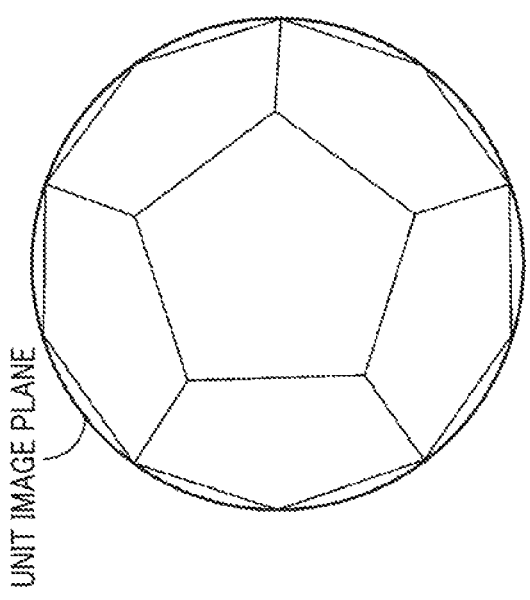
FIG. 5B

IMAGE ANALYZING APPARATUS, IMAGE ANALYZING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-153492, filed on Aug. 4, 2016, in the Japan Patent Office, the entire disclosure of which is hereby incorporated by reference herein.

BACKGROUND

Technical Field

The present invention relates to an image analyzing apparatus, an image analyzing method, and a recording medium.

Description of the Related Art

A technique to extract a region of interest of a user from an image has been widely used in, for example, automatic cropping or generation of thumbnails of the image, or preprocessing of generation of annotation in understanding or searching an image. To extract the region of interest, a method using object recognition or a saliency map has been known.

SUMMARY

Example embodiments of the present invention include an apparatus and a method, each of which reprojects an input image in a plurality of different directions to divide the input image into a plurality of partial images, extracts a feature amount from each of the partial images, and calculates a degree of importance of the input image by position from the extracted feature amount in accordance with a predetermined regression model.

Example embodiments of the present invention include an apparatus and a method, each of which inputs image in a plurality of different directions to divide the input image into a plurality of partial images; extracts a feature amount from each of the partial images; calculates a degree of importance of the input image by position from the extracted feature amount in accordance with a predetermined regression model; calculates a likelihood distribution of an attention point from the calculated degree of importance in accordance with a predetermined regression model; and calculates an attention point in accordance with the likelihood distribution of the attention point.

Example embodiments of the present invention include a non-transitory recording medium storing a program for causing one or more processors to perform any one of the above-described operations.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A and 5B are conceptual views for explaining example processing to be executed by a partial image divider;

Figure 1:
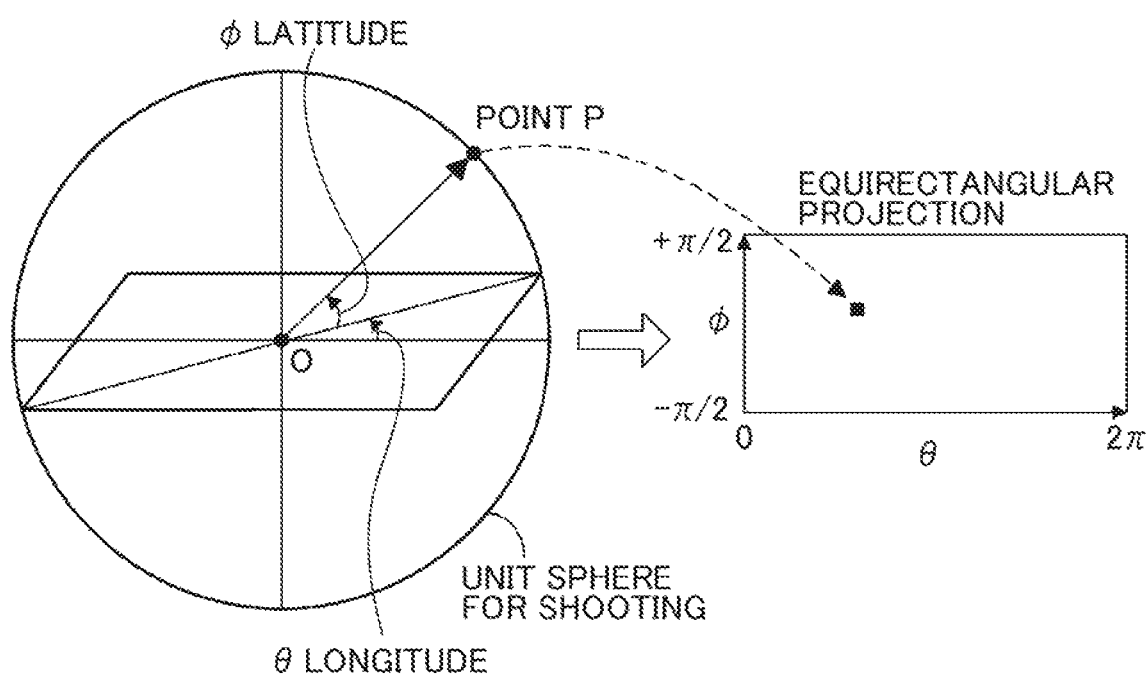
FIG. 1 is a conceptual view for explaining an image of an equirectangular projection (or equidistant cylindrical projection) format.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below, but these embodiments do not intend to limit the present invention. In the accompanying drawings used in the following description, the same reference signs will be given to common elements whose description will not be repeated as appropriate.

According to an embodiment of the present invention, an image analyzing apparatus includes a feature to extract a region of interest from an input image. More particularly, the image analyzing apparatus estimates an attention point (a point in the region of interest or a center of gravity of the region of interest). Before describing the image analyzing apparatus of the present embodiment, a region-of-interest extracting technique of the background art is descried, which is not capable of extracting the region of interest accurately for an ultrawide image. The ultrawide image is an image taken by a fish-eye camera having an angle of view of more than 180 degrees or an omnidirectional camera capable of shooting all directions over 360 degrees.

First, an ultrawide image may be converted into an image of an equirectangular projection (equidistant cylindrical projection) format to extract a region of interest from the converted image. The equirectangular projection format is an expression format mainly used in panoramic shooting. As illustrated in FIG. 1, a three-dimensional direction of a pixel is resolved into latitude and longitude to arrange corresponding pixel values in a square grid. A pixel value can be obtained in the three-dimensional direction according to the coordinate values of the latitude and longitude of the image in the equirectangular projection format. Thus, the image in the equirectangular projection format can be understood as the pixel values plotted on a unit sphere.

In extracting the region of interest directly from the image of the equirectangular projection format, it is not possible to extract the region of interest existing in regions near zenith or nadir of the sphere, or at the boundary of images, where distortion becomes extremely large.

Secondly, an ultrawide image may be divided into a plurality of images to extract the region of interest from the divided images. In this case, however, it is not apparent as to how saliency maps obtained from the individual divided images are integrated.

Moreover, the ultrawide image is supposed to include a plurality of objects having high saliency in one image, but the past techniques do not include any scheme to determine priority of such objects.

To solve the above problems in the conventional region-of-interest extracting techniques, an image analyzing apparatus of the present embodiment includes a function to accurately extract a region of interest (attention point) of a user from an ultrawide image having a large distortion and including a plurality of objects. A specific configuration of the image analyzing apparatus of the present embodiment will be described below.

Figure 2:
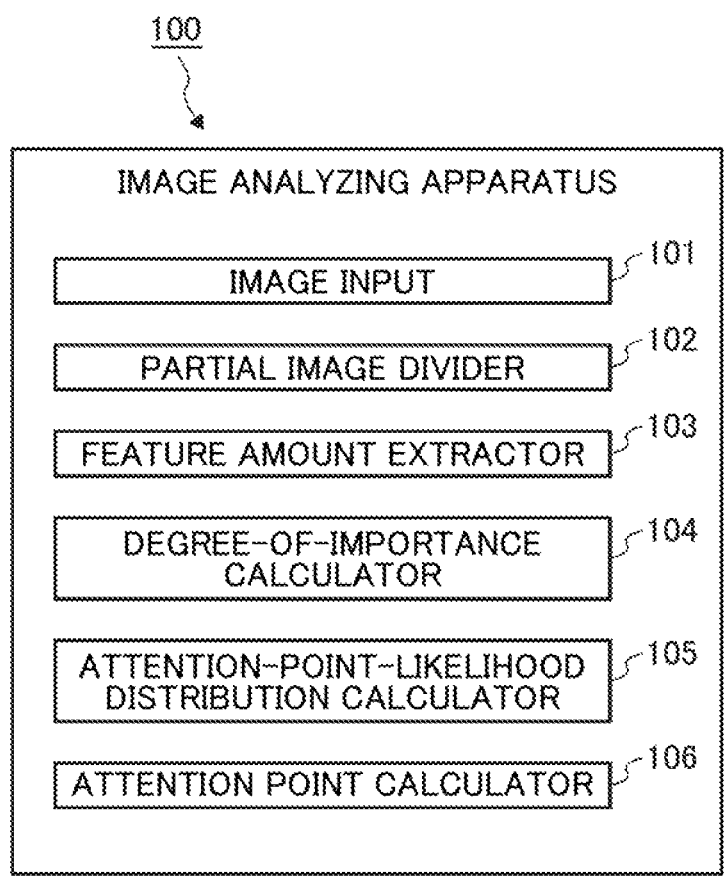
FIG. 2 is a block diagram of functional blocks of an image analyzing apparatus according to a first embodiment.

FIG. 2 illustrates functional blocks of an image analyzing apparatus 100 as a first embodiment of the present invention. As illustrated in FIG. 2, the image analyzing apparatus 100 includes an image input 101, a partial image divider 102, a feature amount extractor 103, a degree-of-importance calculator 104, an attention-point-likelihood distribution calculator 105, and an attention point calculator 106.

The image input 101 inputs a target image to be processed.

The partial image divider 102 reprojects the target image to be processed in a plurality of different directions to divide the target image to be processed into a plurality of partial images.

The feature amount extractor 103 extracts a feature amount from each of the partial images.

From the extracted feature amount, the degree-of-importance calculator 104 calculates a degree of importance for each position of the target image to be processed in accordance with a predetermined regression model.

From the calculated degree of importance, the attention-point-likelihood distribution calculator 105 calculates a likelihood distribution of an attention point in accordance with a predetermined regression model.

In accordance with the calculated attention-point-likelihood distribution, the attention point calculator 106 calculates the attention point.

In the present embodiment, a computer included in the image analyzing apparatus 100 executes a predetermined program to enable the above-described functions of the image analyzing apparatus 100.

Figure 3:
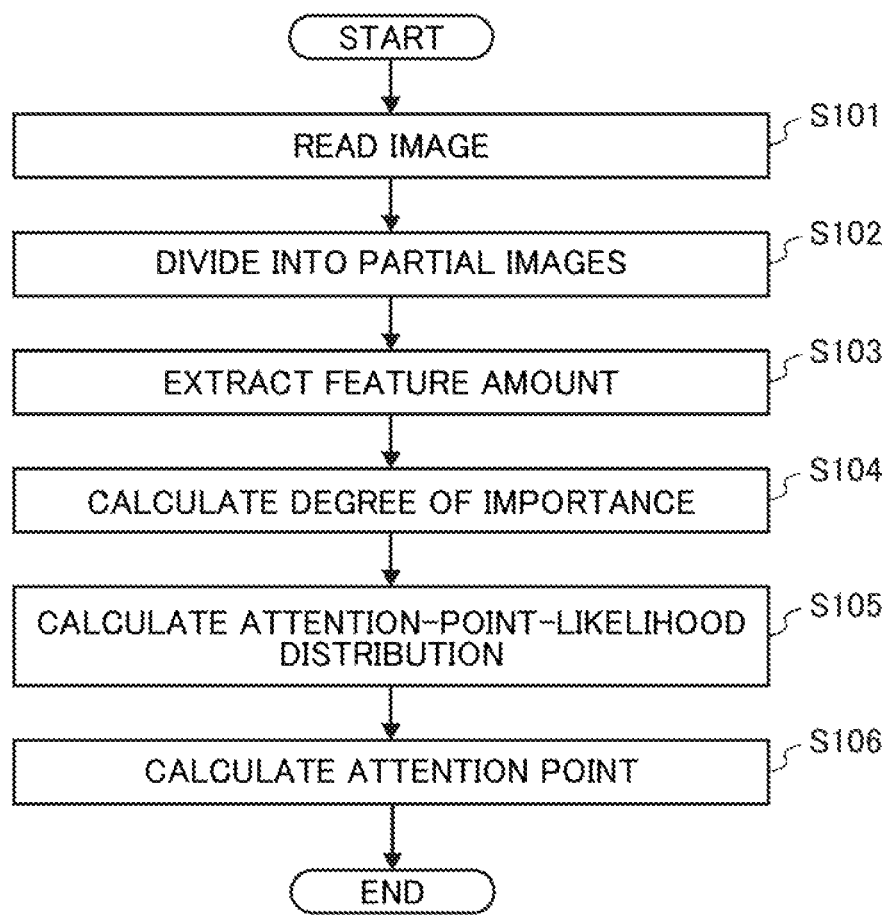
FIG. 3 is a flowchart illustrating operation executed by the image analyzing apparatus of the first embodiment.

The functional configuration of the image analyzing apparatus 100 of the present embodiment has been described. Next, processing details executed by the image analyzing apparatus 100 is described using a flowchart of FIG. 3.

First, at S101, the image input 101 reads an omnidirectional image of the equirectangular projection format as a target image to be processed from a storage area, and inputs the read image. Hereinafter, the image having been input is referred to as an "input image".

Subsequently, at S102, the partial image divider 102 divides the shooting direction of the input image (omnidirectional image) equally and spatially to reproject the input image in a plurality of different shooting directions. Thus, the input image is divided into a plurality of partial images. The division of the input image into the partial images is described.

Figure 4:
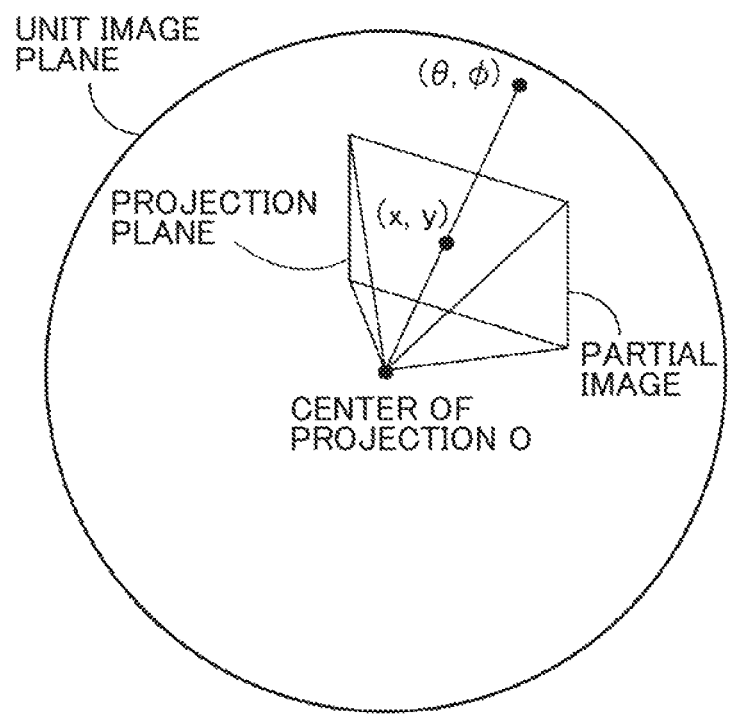
FIG. 4 is a conceptual view for explaining example processing to be executed by a partial image divider.

As illustrated in FIG. 1, a pixel value in the three-dimensional direction can be obtained from coordinate values of the latitude and longitude of the image of the equirectangular projection format. The image of the equirectangular projection format can conceptually be understood as including pixel values plotted on a unit sphere. In the present embodiment, as illustrated in FIG. 4, a predetermined projection plane is defined. With the center of the unit sphere being at the center of projection O, the perspective projection is carried out to cause a pixel value $(\theta, \varphi)$ of the omnidirectional image of the equirectangular projection format to correspond to a pixel value (x, y) on the defined projection plane according to equation (1) below. Thus, the partial image is obtained. In the equation (1), P represents a matrix of the perspective projection, and the equal mark indicates that both sides of the equation are equal by a scalar multiple other than zero.

[Equation 1]

$$\begin{pmatrix} x \\ y \\ 1 \end{pmatrix} = P \begin{pmatrix} \cos\varphi\cos\theta \\ \cos\varphi\sin\theta \\ \sin\varphi \end{pmatrix} \quad (1)$$

Specifically, a regular polyhedron having its center common to the center of the unit sphere is defined as the projection plane of the omnidirectional image of the equirectangular projection format. With a normal line of each surface of the regular polyhedron being the direction of the line of sight, the perspective projection is carried out to obtain partial images. FIG. 5A illustrates an example of a regular octahedron defined as the projection plane of the omnidirectional image. FIG. 5B illustrates an example of a regular dodecahedron defined as the projection plane of the omnidirectional image.

Subsequently, at S103, the feature amount extractor 103 extracts a predetermined feature amount from each partial image obtained in the preceding S102. The feature amount may be extracted for each pixel of the partial image, or from a particular sampling position. In the present embodiment, the input image is divided as described above to calculate the feature amount from the partial image having a small distortion. Thus, it is possible to robustly process the ultra-wide image having a wide angle of more than 180 degrees.

As the feature amount, the present embodiment can use colors, edges, saliency, object positions/labels, and so on.

The color feature can be represented by values in a specific color space (e.g., RGB or L*a*b*), or the Euclidean distance or Mahalanobis distance from a particular color (e.g., color of the skin).

The edge feature can be represented by the direction or intensity of the pixel values extracted using a Sobel filter or a Gabol filter.

The saliency can be represented by values of saliency extracted by an existing saliency extracting algorithm.

For example, a region-of-interest extracting technique on the basis of the object recognition includes a technique of detecting a face region from the image to extract an image of the face region, or a technique of detecting a human to extract a region of the human from the image.

Meanwhile, in extracting the region of interest using the saliency map, a low-order feature amount, such as colors or edges, is used to allow more universal extraction of the region of interest. In one example, a human vision model, which has been studied in the field of brain and neuroscience, may be used to generate a saliency map in a bottom-up manner from local features of the image. Alternatively, the saliency map can be obtained accurately by a technique to multiply an edge amount map calculated for each pixel by a region-of-interest weighing map. The saliency can further be calculated by a technique to combine the feature amount of the image with depth information.

Moreover, a recent approach of extracting the region-of-interest uses higher order and more meaningful information with respective to the lower-order features (e.g., colors, edges, or depths) of the image. For example, the higher-order features of the image can be extracted using a neural network to estimate the region of interest.

The object position/label features to be used include the position of an object (usually expressed by the coordinates of four corners of a detected rectangle) that has been detected by existing object detecting algorithm and the type of the object (e.g., face, human, or car). Herein, the algorithm disclosed in Japanese Patent Registration No. 4538008 (International Patent Publication No. WO 2007/020789) and Japanese Patent Registration No. 3411971 (Japanese Patent Publication No. 2002-24544) described above may be used as an example object detecting algorithm.

Obviously, the above-described feature amounts are not limiting to the feature amounts capable of being used in the present embodiment, and other feature amounts that have conventionally been used in the field of image recognition (e.g., local binary patterns (LBP), Haarlikefeature, histogram of oriented gradients (HOG), or scale-invariant feature transform (SIFT)) may also be used.

Subsequently, at S104, the degree-of-importance calculator 104 calculates the degree of importance for each position (pixel) of the input image according to the feature amount extracted from each partial image using the predetermined regression model. This is described in detail below.

Assume that vector h represents a vector arranging the feature amounts for each position of the i-th partial image among the N partial images divided from the input image, and that vector g represents a vector arranging the degree of importance for each position of the input image. The regression model f expressed by the equation (2) is considered.

[Equation 2]

$$g = f(l_1, l_2, \ldots, l_N) \quad (2)$$

Equation (3) illustrates a linear conversion as a specific format of the regression model f.

[Equation 3]

$$g = W \begin{pmatrix} l_1 \\ l_2 \\ \vdots \\ l_N \end{pmatrix} + b \quad (3)$$

In the equation (3), W and b represent parameters. In the present embodiment, training data using feature amount $l_i$ as input and the degree of importance g as output is prepared in advance, and the training data is subjected to learning to identify parameters W and b.

In doing this, the present embodiment assumes that the degree of importance g which is the output (teacher data) of the training data is obtained in an appropriate manner. One of the simplest ways of obtaining the degree of importance g is that an examinee designates a region that the examinee considers to be important in the target image, and the degree of importance of the pixels included in the region designated by the examinee is set to "1" while setting the degree of importance of the other pixels is set to "0". Alternatively, a locus of the viewpoint of the examinee who sees the target image is obtained by, for example, an eye tracker, and the obtained locus (line) is subjected to Gaussian blur to obtain the degrees of importance (from 0 to 1) which is normalized in accordance with the contrast level of the blurred locus.

Figure 6:
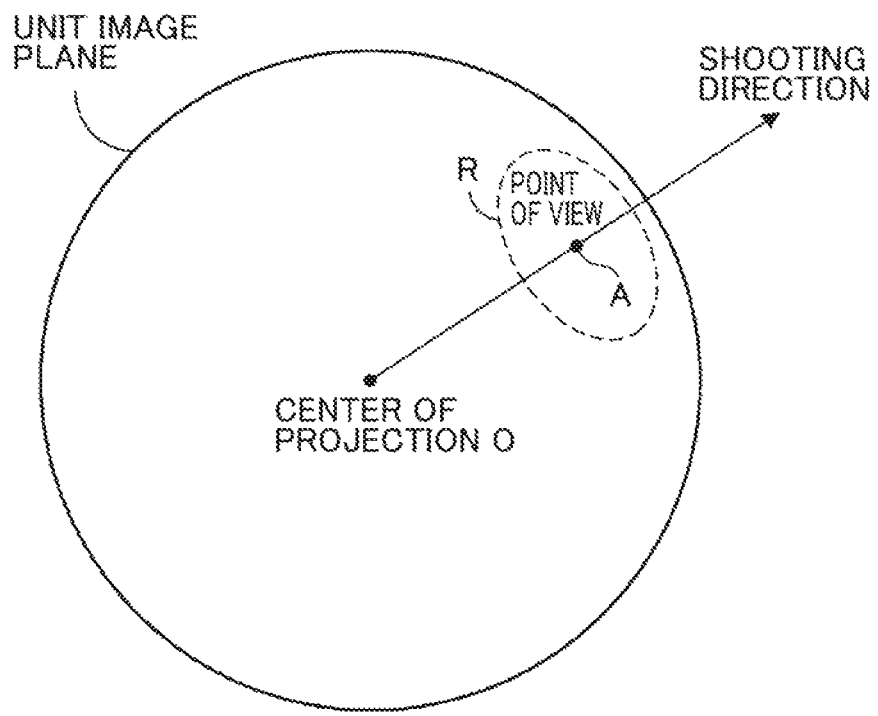
FIG. 6 is a conceptual view for explaining example processing to be executed by an attention-point-likelihood distribution calculator.

At S105, based on the design concept that the attention points of the user are present in the direction having a higher degree of importance, the attention-point-likelihood distribution calculator 105 calculates the likelihood of the attention points in accordance with the distribution of the degree of importance calculated previously at S104. In the present embodiment, as illustrated in FIG. 6, a region R is defined around the viewpoint A being as a center through which the shooting direction extends. The degree of importance at each position in the region R is added and the added value can be calculated as the likelihood of the attention point at the viewpoint A. Further, in the present embodiment, a weight is added to the degree of importance of each position in the region R, so that the degree of importance attenuates as each position becomes away from the viewpoint A. Using such a weight, a weight-added value of the degree of importance can be calculated as the likelihood of attention point of the viewpoint A.

With a three-dimensional vector p in the shooting direction, and a degree of importance g(p) in the shooting direction p, the likelihood of attention point a(p) is formulated as equation (4):

[Equation 4]

$$a(p) = \eta \left( \int g(q) w(p, q) dq \right) \quad (4)$$

In the equation (4), η represents a monotonic increase function, w(p, q) represents the weight, the integration is a definite integral, and the range of the integration is the entire unit sphere for shooting. In the present embodiment, η can be an exponential function, and the w(p, q) is a function expressed in equation (5).

[Equation 5]

$$w(p,q) = \exp(ap^T q) \quad (5)$$

The above equation (5) is based on the von Mises distribution. If the directions p and q are identical, the distribution is maximum. If the directions p and q are directed oppositely, a minimum distribution results. In the present embodiment, parameter a can determine the attenuation rate of the weight, allowing an angle of view reflecting the attention point to be reflected.

Further, in the present embodiment, the weight w(p, q) can be expressed as equation (6) below with $\{\alpha_i\}$ being a parameter, so that the polynomial equation of an inner product of the directions p and q can be provided as an argument.

[Equation 6]

$$w(p, q) = \exp\left(\sum_i \alpha_i (p^T q)^i\right) \quad (6)$$

Description continues by referring back to FIG. 3.

At S106, the attention point calculator 106 calculates the attention point in accordance with the attention point likelihood distribution a(p). For example, in the present embodiment, the position corresponding to a shooting direction p that corresponds to the maximum likelihood value of the likelihood of attention point a(p) may be calculated as the attention point. Alternatively, the position corresponding to the shooting direction p that corresponds to an average value of the attention point likelihood distribution a(p) may be provided as an attention point, as with the equation (7). The integral of the equation (7) is a definite integral, with an integral range being the entire shooting unit spherical surface.

[Equation 7]

$$\bar{p} = \int p a(p) dp \quad (7)$$

The present embodiment may calculate positions corresponding to N shooting directions p (N is an integer of at least 1) that correspond to a local maximum value of the attention point likelihood a(p) as the attention points. If a plurality of local maximum values of the attention point likelihood a(p) are present, a plurality of attention points can be obtained. The local maximum value of the attention point likelihood a(p) can be determined by hill climbing from the initial value of p which is randomly generated. If it is desired to determine M attention values at discrete positions, a plurality of attention points can be determined as p1, p2, . . . , pM that can maximize an evaluation function of equation (8):

[Equation 8]

$$J = \sum_{i=1}^{M} a(p_i) + d(p_1, p_1, \ldots, p_M) \quad (8)$$

In the equation (8), d represents a function representing a distance between viewpoints, such as a dispersion among p1, p2, . . . , pM or a sum of the Euclidean distance between viewpoints.

The series of processing steps of calculating the attention points from the input image (omnidirectional image in the equirectangular projection format) have been described. If the image analyzing apparatus 100 of the present embodiment is used in cropping or generation of thumbnails, the region of interest is defined by setting a particular angle of view around the attention point determined by the above-described procedure, and the image of the defined region of interest is used as it is as a cropped image or a thumbnail image. In this case, the angle of view to be set is preferably the angle of view of the region of interest including the attention point in the training data that has been given to the regression model. Meanwhile, if the image analyzing apparatus 100 of the present embodiment is applied to the image recognition/image searching system, the object region including the attention point is used as an object for recognition or search.

As described above, the present embodiment does not calculate the attention point directly from the feature amount of each partial image. Instead, the configuration adopted by the present embodiment includes calculating the degree of importance using a first regression model according to the feature amount of each partial image, and then calculating the attention point with a second regression model according to the calculated degree of importance. Thus, it is possible to calculate the degree of importance by reflecting the mutual interaction among the partial images, enabling accurate estimation of the attention point of the image including a plurality of high-salient objects in the image such as an ultrawide image, while decreasing the number of explanatory variables to improve generalization capability.

The following design changes are available for the first embodiment described above.

For example, the input image may be divided by an arbitrary dividing method other than dividing the spherical surface of the omnidirectional image by approximating the regular polyhedrons. For example, the spherical surface of the omnidirectional image may be divided by approximating quasi-regular polyhedrons, or by Voronoi division with randomly developed seeds on the spherical surface of the omnidirectional image.

Figure 7:
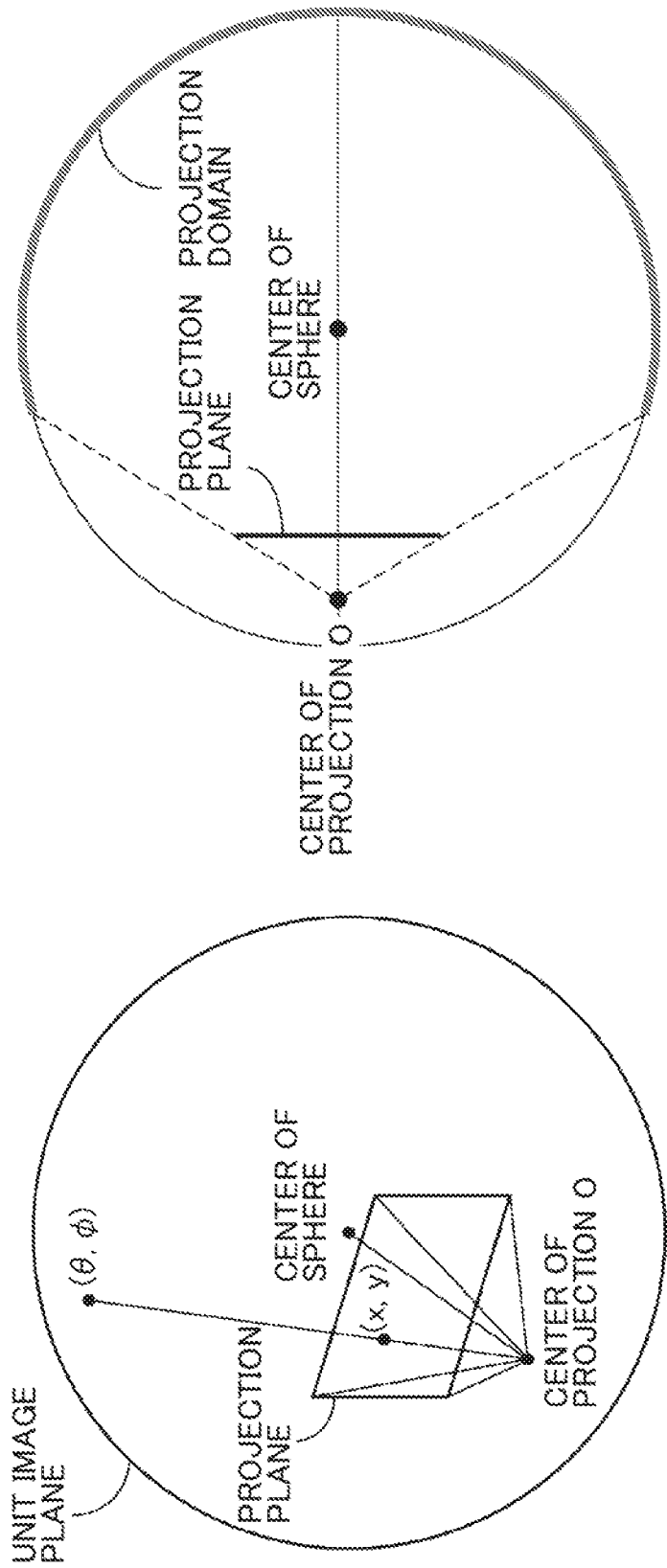
FIGS. 7A and 7B are conceptual views for explaining example processing executed by the partial image divider.

The partial images are not limited to the images obtained by perspective projection of the omnidirectional image, and may be obtained by other projection methods. For example, the partial images may be obtained by orthographic projection. Alternatively, the perspective projection may be carried out by shifting the center of projection O from the center of the unit sphere, as illustrated in FIGS. 7A and 7B. According to the projection method illustrated in FIGS. 7A and 7B, the distortion of projection at the edge of the image can be alleviated, while allowing the projection of the angle of view of at least 180 degrees. Thus, the extraction of the features of the element is possible by a smaller number of divided imaged.

If an image taken by a camera having an angle of view of less than 360 degrees is processed, the image having such an angle of view is converted into an image of the equirectangular projection format (partially excluded image) which is processed in the same procedure as described above.

Even when the image to be processed is not in the equirectangular projection format, the image processing can be carried out similarly as described above, so long as the camera that takes the image has been calibrated (i.e., directions of light rays in the three-dimensional space corresponding to the position of the imaging surface of the camera are known). When the image to be processed is taken by an uncalibrated camera, the image cannot be divided by approximating regular polyhedrons, but an applicable other dividing method (e.g., the Voronoi division mentioned above) may be used to divide the region.

In the above, the first embodiment of the present invention in which the attention point is estimated from the input image in accordance with the linear regression model has been described. Next, a second embodiment of the present invention is described. The second embodiment differs from the first embodiment in that a neural network is used to estimate the attention point from the input image. In the following, what are common to the first embodiment will not be described and only the parts which differ from the first embodiment are mainly described.

Figure 8:
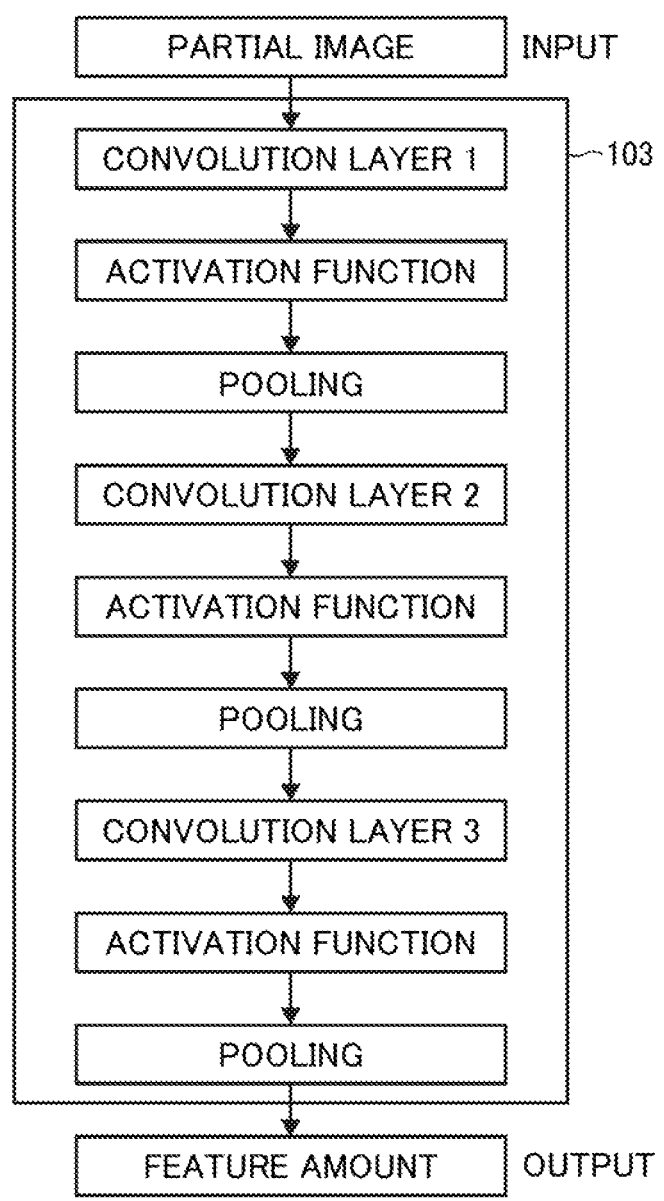
FIG. 8 is a diagram illustrating a neural network configuration of a feature amount extractor according to a second embodiment.

In the second embodiment, the feature amount extractor 103 is provided as a neural network to which a partial image is input and from which a feature amount is output. For example, the feature amount extractor 103 can be formed using a convolution network, such as the one used in areas of object recognition, as illustrated in FIG. 8. In this case, a filter operation including a plurality of kinds of weights is carried out in a convolution layer ("convolution layer 1", "convolution layer 2", "convolution layer 3") to calculate a value which is then converted by an activation function ("activation function"). Examples of the activation function include a logistics function, an inverse tangent function, and a rectified linear activation unit (ReLU) function. Pooling ("pooling") is a downsizing operation of variables, such as maxpooling or average pooling.

Figure 9:
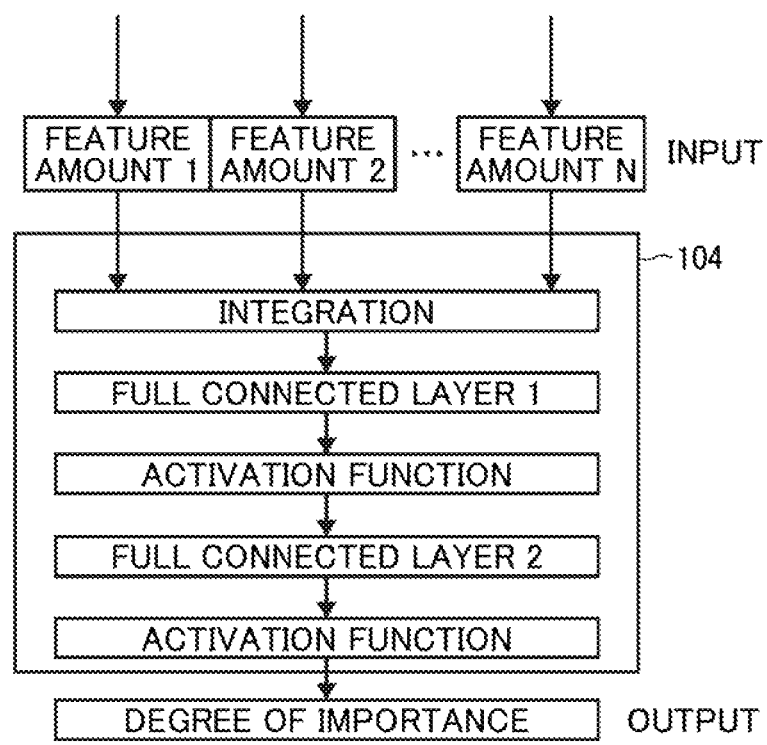
FIG. 9 is a diagram illustrating a neural network configuration of a degree-of-importance calculator of the second embodiment.

In one example, the degree-of-importance calculator 104 is implemented as a neural network to which a group of feature amounts extracted from the partial images is input and from which a degree of importance corresponding to the position of the input image is output. The degree-of-importance calculator 104 integrates, as illustrated in FIG. 9, the input feature amounts ("feature amount 1 to N") and repeatedly carries out linear conversion in a full connected layer ("full connected layer 1, 2") and non-linear conversion of the activation function ("activation function") to calculate the degree of importance.

In one example, learning is carried out in advance using training data to identify parameters for the neural networks that form the feature amount extractor 103 and the degree-of-importance calculator 104. The present embodiment may also use a method called fine tuning in which the learning is carried out at least in the feature amount extractor 103 or the degree-of-importance calculator 104, and the feature amount extractor 103 and the degree-of-importance calculator 104 are connected as one network to allow overall learning.

Figure 10:
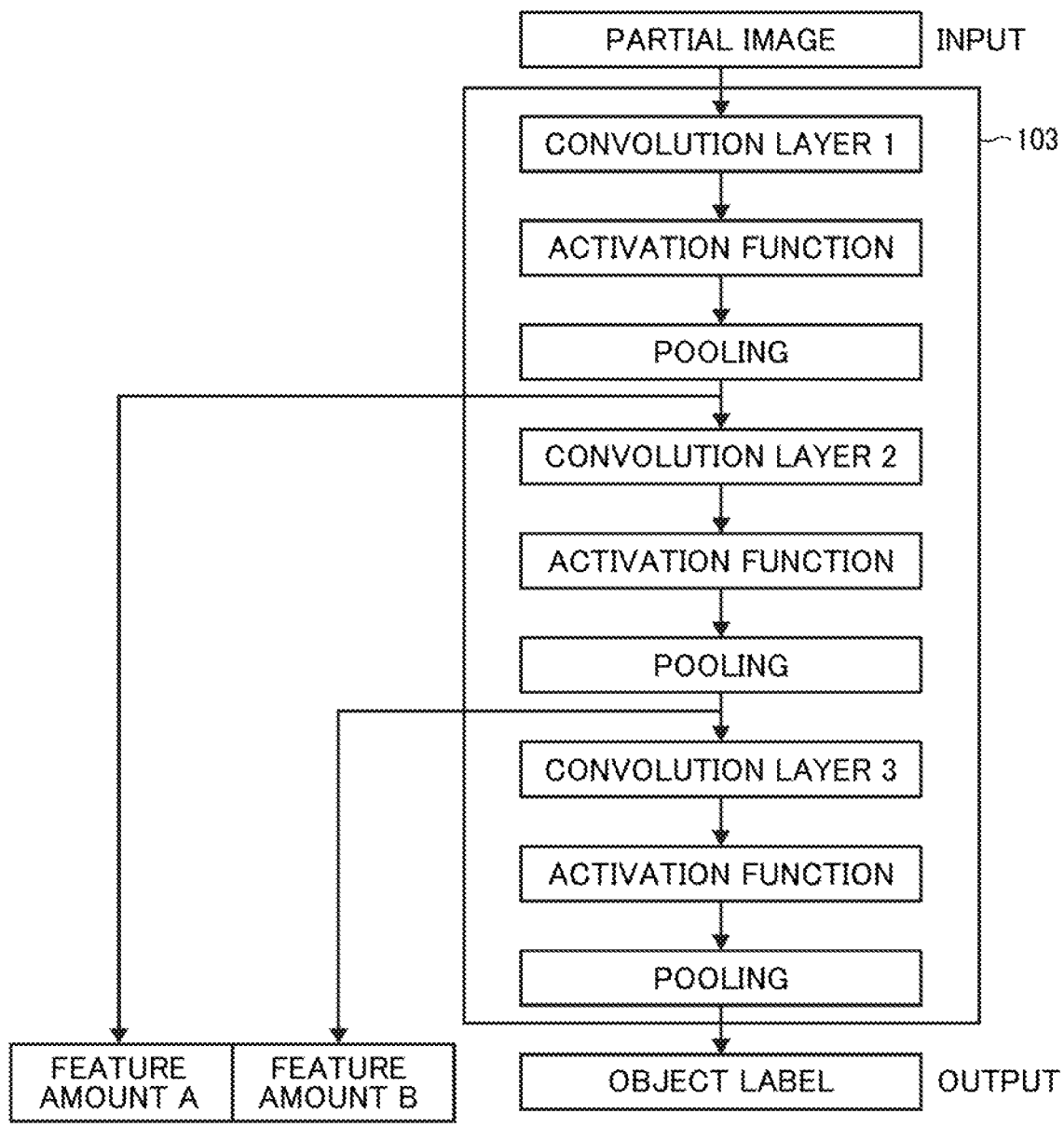
FIG. 10 is a diagram illustrating a neural network configuration of the feature amount extractor of the second embodiment.

In one example, the feature amount extractor 103 learns using data set of the partial images and the feature amounts (e.g., saliency and object label) as the training data, while the degree-of-importance calculator 104 learns using the data set of the feature amounts (e.g., saliency and object label) and the degree of importance as the training data. Moreover, in the present embodiment, values are extracted from intermediate layers of the network, after the data set of the partial images and the object labels (feature amount) are learned, to let the degree-of-importance calculator 104 learn the data set of the values of the intermediate layers and the degree of importance, as illustrated in FIG. 10. In the present embodiment, the feature amount extractor 103 and the degree-of-importance calculator 104 may be regarded as a network to allow learning of the data set of the input image and the degree of importance.

In one example, the attention-point-likelihood distribution calculator 105 may be implemented as a neural network to which the degree of importance is input and from which the likelihood distribution of attention points is output. In the present embodiment, the above-described equation (4) is understood as converting a convolution result of the likelihood of attention point a(p) and the degree of importance g(p) by the function η. The function η is regarded as an activation function that substitutes the integral of the convolution by numerical integral of the discretized variable q, thus allowing calculation in the neural network format.

In this example, the attention-point-likelihood distribution calculator 105 can learn in the following manner. The parameter to be determined is a weight w(p, q) for weighted summation of the degree of importance. This can be learned directly or fixed at the value of the equation (6). Alternatively, the value of the equation (6) is set as an initial value for learning.

Figure 11:
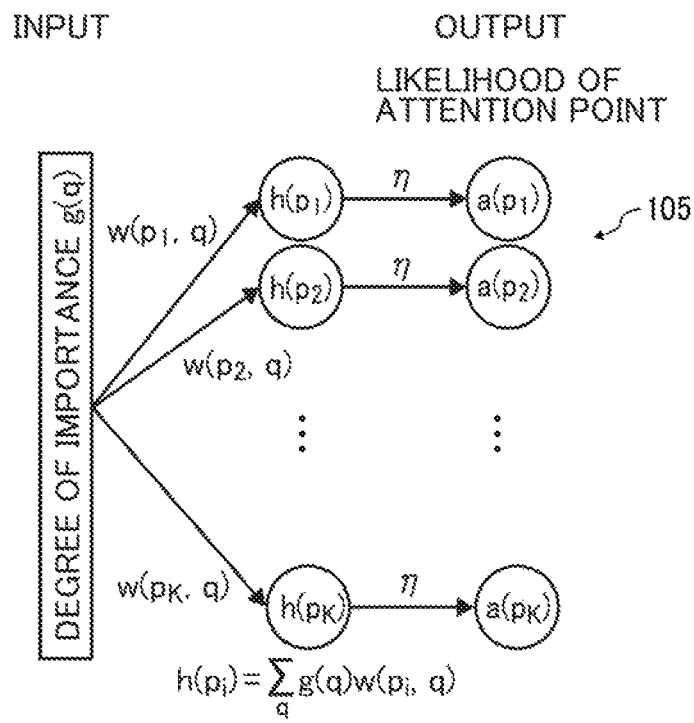
FIG. 11 is a diagram illustrating a neural network configuration of an attention-point-likelihood distribution calculator of the second embodiment.

FIG. 11 illustrates a neural network configuration of the attention-point-likelihood distribution calculator 105.

Figure 12:
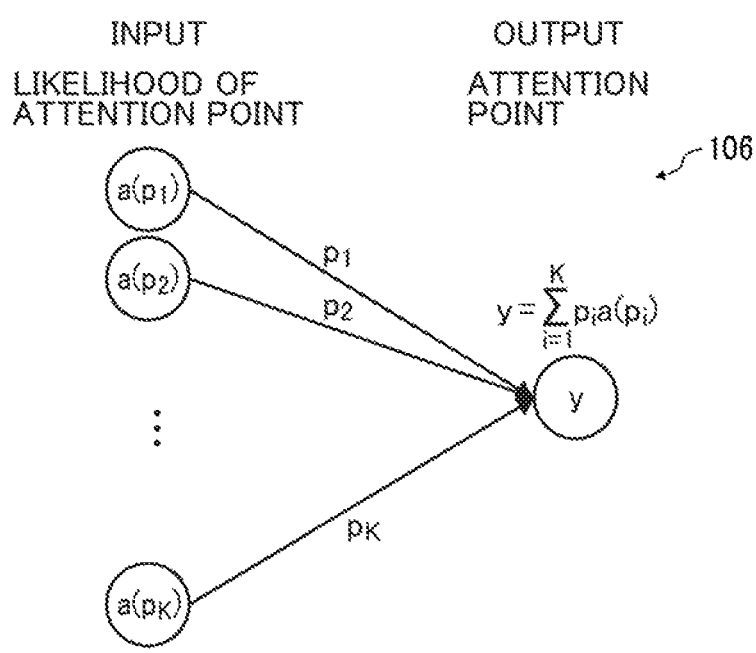
FIG. 12 is a diagram illustrating a neural network configuration of the attention point calculator of the second embodiment.

In the present embodiment, the attention point calculator 106 is formed as a neural network to which the likelihood distribution of the attention points is input and from which the attention point is output. FIG. 12 is a configuration example of the attention point calculator 106 formed to generate the attention point corresponding to an average value of the likelihood distribution of the attention points corresponding to the equation (6). The attention point calculator 106 is not limited to the configuration of FIG. 12, and may also be configured to output the maximum value as the attention point using the maximum output layer.

Figure 13:
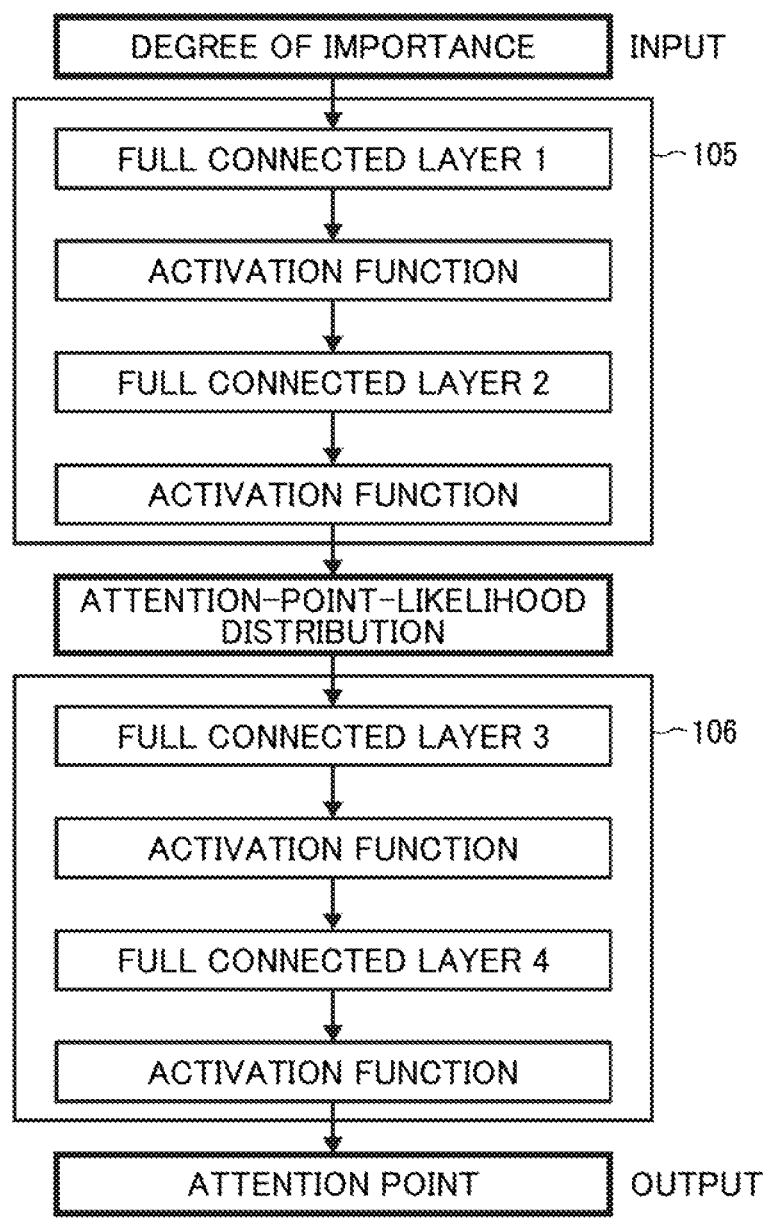
FIG. 13 is a diagram illustrating a neural network configuration of the second embodiment.

The network weight of the attention point calculator 106 is fixed in the direction of viewpoints (p1, p2, ..., pk) to which adjustment is intrinsically not necessary. Alternatively, however, the fixed viewpoints direction is given as the initial value and adjusted by learning. In the present embodiment, it is also possible for the attention-point-likelihood distribution calculator 105 and the attention point calculator 106 may be regarded as a single network to form the neural network as illustrated in FIG. 13.

Figure 14:
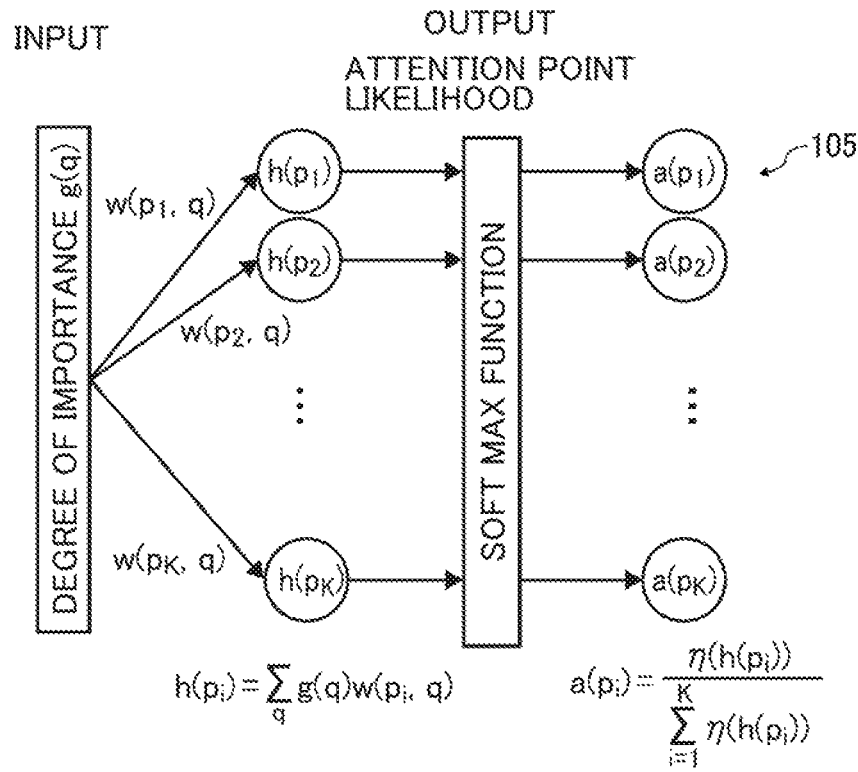
FIG. 14 is a diagram illustrating a neural network configuration of the second embodiment.

When learning the attention points, an angle between the vector of the attention point of the teacher data and the vector of the calculated attention point can be used as an error function in the present embodiment. The Euclidean distance between the attention point of the teacher data and the predicted attention point may be used as the error. If the Euclidean distance is used, a norm is also evaluated in addition to the direction of the vector of the attention point. It is, therefore, preferable to introduce a normalizing step to normalize the likelihood of attention point a(p). This can be implemented using a softmax function including the function η. FIG. 14 is a configuration example of the normalization of the likelihood of the attention point a(p) with the softmax function.

In the present embodiment, the attention-point-likelihood distribution calculator 105 and the attention point calculator 106 may learn separately, or entire learning may be carried out as one network. Alternatively, one calculator may learn first and the entire fine tuning follows.

In the above description, the feature amount extractor 103, the degree-of-importance calculator 104, the attention-point-likelihood distribution calculator 105, and the attention point calculator 106 are implemented as the neural networks. Alternatively, these four portions may be implemented as a single neural network, or at least one of four portions may be replaced with a linear regression.

As described above, the present embodiment uses the neural network estimate the attention point from the input image (omnidirectional image in the equirectangular projection format), allowing total optimization from input to output and scalable learning of a large volume of training data. As a result, the attention point can be estimated accurately.

Although the attention point is estimated from the input image using the neural network in the second embodiment described above, at least one of the neural networks described above may be replaced with other non-linear regression, such as support vector regression or random forest regression.

In the above-described configuration, the degree of importance is calculated from the feature amount of each partial image using the first regression model, and the calculated degree of importance is used to calculate the attention point using the second regression model. However, the degree of importance calculated with the first regression model can be used for different purposes of use as below. For example, in the embodiments of the present invention, the degree of importance calculated from the input image can be used to generate a heat map of attention points of a user in the input image. Alternatively, the degree of importance calculated from the input image can be used to control bit rate allocated to the input image when the image is compressed. Specifically, a higher bit rate is allocated to pixels having a higher degree of importance and a lower bit rate is allocated to pixels having a lower degree of importance, thus optimizing the quality of the image. Thus, the image analyzing apparatus 100 according to the embodiments of the present invention can be considered not only as the apparatus that calculates the attention points of the input image, but can also be considered as the apparatus that calculates the degree of importance for each position of the input image.

Moreover, the embodiments of the present invention have been described mainly as a two-step method in which the first regression model is used to calculate the degree of importance from the feature amount of the partial images, followed by calculating the attention points using the second regression model from the calculated degree of importance. Alternatively, however, a composite function, which uses the partial images as input and the attention points as output and has an intermediate variable corresponding to the degree of importance described above, may be designed. As a result, a regression model can be formed by a single step learning using the training data in which partial images (or feature amount extracted from the partial images) are input and the attention point is output. In this case, the intermediate variable of the composite function can be used in place of the above-described degree of importance to visualize the attention points of the user or control allocation of bit rate in image compression.

Figure 15:
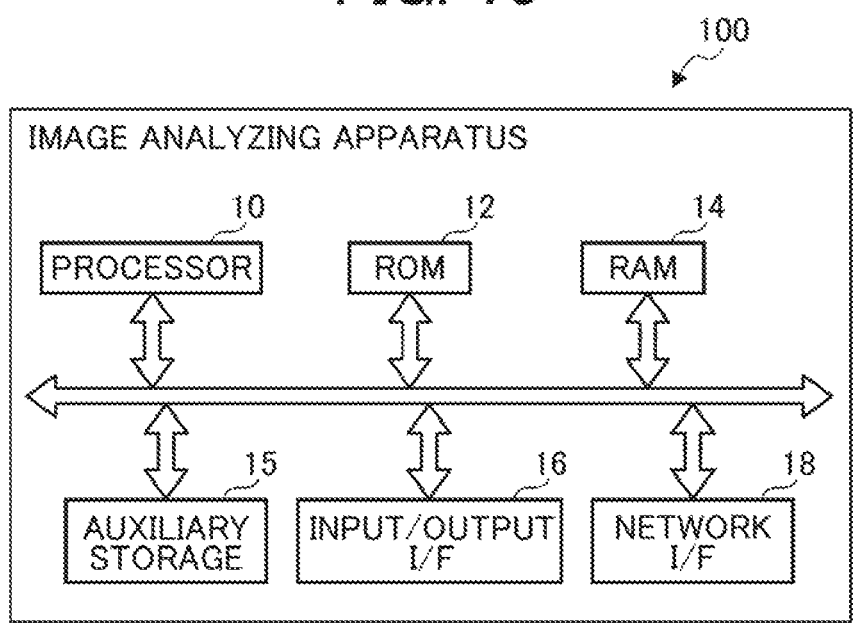
FIG. 15 is a schematic block diagram illustrating a hardware configuration of an image analyzing apparatus according to an embodiment.

Referring to FIG. 15, a hardware configuration of a computer included in the image analyzing apparatus 100 of the embodiments of the present invention is described.

As illustrated in FIG. 15, a computer of the image analyzing apparatus 100 according to the embodiments of the present invention includes a processor 10 that controls entire operation of the apparatus such as a central processing unit (CPU), a read only memory (ROM) 12 that stores a boot program, a firmware program, and so on, a random access memory (RAM) 14 that provides an area to execute programs, an auxiliary storage 15 that stores a program or an operating system (OS) to enable the above-described functions of the image analyzing apparatus 100, an input/output interface 16 used to connect to an external input/output device, and a network interface 18 used to connect to a network.

The features of the above-described embodiments are implemented by programs described in programming languages, such as C, C++, C #, Java (registered trademark). In the embodiments of the present invention, such programs can be distributed as being stored in a storage medium, such as a hard disk device, a compact disc read-only memory (CD-ROM), a magnetooptical disc (MO), a digital versatile disc (DVD), a flexible disc, an electrically erasable programmable read-only memory (EEPROM), or an erasable programmable read-only memory (EPROM), or transferred via a network in a formal readable by other devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image analyzing apparatus, comprising:
a memory that stores a plurality of instructions; and
processing circuitry that executes the plurality of instructions to:
reproject an input image in a plurality of different directions to divide the input image into a plurality of partial images;
extract a feature amount from each of the partial images;
calculate a degree of importance of each pixel of the input image based on the extracted feature amount and in accordance with a predetermined regression model;
calculate a likelihood distribution of an attention point from the calculated degree of importance of each pixel of the input image in accordance with the predetermined regression model, and
calculate the attention point from the likelihood distribution.

2. The image analyzing apparatus according to claim 1, wherein the processing circuitry calculates, as the attention point, a position of a pixel corresponding to one of a maximum likelihood value, an average value, and a local maximum value of the likelihood distribution of the attention point.

3. The image analyzing apparatus according to claim 1, wherein the processing circuitry further executes the plurality of instructions to add the degree of importance to calculate the likelihood distribution of the attention point.

4. The image analyzing apparatus according to claim 1, wherein the processing circuitry is further configured to train a neural network to
calculate a likelihood distribution of an attention point from the calculated degree of importance of each pixel of the input image in accordance with the predetermined regression model, and calculate the attention point from the likelihood distribution.

5. The image analyzing apparatus according to claim 1, wherein the input image is of an equirectangular projection format.

6. The image analyzing apparatus according to claim 5, wherein the input image includes pixel values plotted on a unit sphere.

7. The image analyzing apparatus according to claim 1, wherein the input image is an omnidirectional image.

8. The image analyzing apparatus according to claim 1, wherein the processing circuitry extracts the feature amount from each of the partial images to minimize distortion.

9. The image analyzing apparatus according to claim 1, wherein the degree of importance of each pixel of the input image is training data for training a neural network.

10. A method for extracting a degree of importance of an input image by position, the method comprising:

reprojecting the input image in a plurality of different directions to divide the input image into a plurality of partial images;

extracting, by processing circuitry of an image analyzing apparatus, a feature amount from each of the partial images;

calculating, by the processing circuitry, a degree of importance of each pixel of the input image based on the extracted feature amount and in accordance with a predetermined regression model;

calculating a likelihood distribution of an attention point from the calculated degree of importance of each pixel in the input image in accordance with the predetermined regression model; and calculating an attention point from the likelihood distribution.

11. The method according to claim 10, wherein the calculating the attention point includes calculating a position of a pixel corresponding to one of a maximum likelihood value, an average value, and a local maximum value of the likelihood distribution of the attention point as the attention point.

12. The method according to claim 10, wherein the calculating the likelihood distribution of the attention point includes adding the degree of importance.

13. An image analyzing apparatus, comprising:

processing circuitry configured to:

reproject an input image in a plurality of different directions to divide the input image into a plurality of partial images;

extract a feature amount from each of the partial images; and calculate a degree of importance of each pixel of the input image based on the extracted feature amount and in accordance with a predetermined regression model; and a neural network is configured to calculate a likelihood distribution of an attention point from the calculated degree of importance of each pixel of the input image in accordance with the predetermined regression model; and calculate the attention point from the likelihood distribution.

14. The image analyzing apparatus according to claim 13, wherein the neural network calculates, as the attention point, a position of a pixel corresponding to one of a maximum likelihood value, an average value, and a local maximum value of the likelihood distribution of the attention point.

15. The image analyzing apparatus according to claim 13, wherein the neural network is further configured to add the degree of importance to calculate the likelihood distribution of the attention point.

* * * * *